(12) United States Patent
Cressman (10) Patent No.: US 6,447,398 B1
(45) Date of Patent: Sep. 10, 2002

(54) REDUCED LENGTH UNIVERSAL JOINT ASSEMBLY

(76) Inventor: Gerald E. Cressman, 46317 260th St., Hartford, SD (US) 57033

( * ) Notice: Subject to any disclaimer, the term of this patent is extended or adjusted under 35 U.S.C. 154(b) by 0 days.

(21) Appl. No.: 09/995,974

(22) Filed: Nov. 19, 2001

(51) Int. Cl.[7] .................................................. F16D 3/40
(52) U.S. Cl. ........................ 464/134; 464/171; 180/908
(58) Field of Search ................................ 464/128, 129, 464/134, 135, 136, 171, 179; 180/380, 383, 908

(56) References Cited

U.S. PATENT DOCUMENTS

| | | | | |
|---|---|---|---|---|
| 1,252,068 A | * | 1/1918 | Williams | 464/171 X |
| 1,336,985 A | * | 4/1920 | Thiemer | 464/135 |
| 1,357,320 A | * | 11/1920 | Hardy | 464/171 X |
| 1,799,200 A | * | 4/1931 | Urschel | 464/171 |
| 1,903,968 A | * | 4/1933 | Hosmer | 180/908 |
| 3,542,162 A | * | 11/1970 | Kerr et al. | 188/134 X |
| 3,703,089 A | | 11/1972 | Geisthoff et al. | |
| 3,887,024 A | | 6/1975 | Takahashi et al. | |
| 4,169,686 A | | 10/1979 | Balensiefen et al. | |
| 4,265,327 A | | 5/1981 | Geisthoff | |
| 4,431,334 A | | 2/1984 | Cleveland et al. | |
| 4,522,608 A | | 6/1985 | Joyner | |
| 4,571,831 A | * | 2/1986 | White, III | 56/12.7 X |
| 4,583,960 A | * | 4/1986 | Joyner | 464/134 |
| D329,244 S | | 9/1992 | Saito et al. | |
| 5,292,182 A | * | 3/1994 | Kanazawa et al. | 301/65 |
| 6,056,329 A | * | 5/2000 | Kitani et al. | 285/906 |
| 6,085,859 A | | 7/2000 | Alderson | |

FOREIGN PATENT DOCUMENTS

GB 1 345 664 * 1/1974 ................. 464/136

OTHER PUBLICATIONS

Machinery's Handbook, 25th ed., New York, International Press, 1996. p. 2042. TJ151.M3 1996.*
Copy of page form World Wide Web site of "MPD Racing Products" featuring "Driveline Components". Vallejo, CA. Dated Oct. 10, 2001. 2 pages.
Copy of p. 16 of "Sander Engineering, Inc." catalog from World Wide Web. Torrance, CA. Printout dated Oct. 10, 2001.
Copy of p. 17 of "Sander Engineering, Inc." catalog from World Wide Web. Torrance, CA. Printout dated Oct. 10, 2001.
Copy of p. 19 of "Sander Engineering, Inc." catalog from World Wide Web. Torrance, CA. Printout dated Oct. 10, 2001.

* cited by examiner

Primary Examiner—Greg Binda (57) ABSTRACT

A reduced length universal joint assembly includes a yoke joined to a flange by a spider. The yoke includes a shaft portion and yoke ears mounted on the shaft portion. The joint assembly includes a flange for connecting to a crankshaft. The flange includes a flange plate and flange ears mounted on the flange plate and extending from the flange plate. A pair of cupped areas is formed in the flange plate for providing space for each of the yoke ears of the yoke. A portion of a second side of the flange plate defines a plane, and the cupped areas extend through the plane of the second side and into the flange plate. A portion of each of the yoke ears extends substantially adjacent to the plane of the second side of the flange plate when axes of rotation of the yoke and flange are collinear.

22 Claims, 8 Drawing Sheets

REDUCED LENGTH UNIVERSAL JOINT ASSEMBLY

BACKGROUND OF THE INVENTION

1. Field of the Invention

The present invention relates to universal joint assemblies and more particularly pertains to a reduced length universal joint assembly for optimizing the manner of transferring torque from a rear axle of a vehicle to the chassis of the vehicle.

2. Description of the Prior Art

In racing vehicles, such as midget- and sprint-type open wheel racing cars, the desire to obtain the fastest travel times about a race track requires maximizing the speed of the racing car and optimizing the handling capability of the racing car as it moves around the track so that the speed generated is not wasted due to the driver's inability to keep the car moving along the desired (e.g., shortest) path about the track.

The drivetrain of a racing car differs from a conventional automobile in that a portion of the racing car drivetrain forms a significant element of the suspension that locates the rear axle and wheels on the racing car. A common drivetrain of a racing car typically includes a motor, a driveline, and a rear end assembly. The rear end assembly includes a rear axle housed in a rear axle housing (which actually comprises two rear axle segments), various gears connected to the rear axle segments, and rear wheels mounted on the outer ends of the rear axle segments. The driveline includes a drive shaft, and a tubular housing that is rigidly connected to the rear axle housing. The drive shaft rotationally connects the crankshaft of the motor to the gears in the rear end assembly. The tubular housing of the driveline, often referred to as a torque tube, is rigidly connected to the rear axle housing and extends forwardly from the rear axle housing. The torque tube is joined to the chassis of the racing car by an engine mounting plate, which typically has the engine directly mounted on its forward side. Typically, a forward end of the torque tube is mounted on a rearward side of the engine mounting plate by a swivel joint. The swivel joint is generally comprised of a torque ball mounted on the forward end of the torque tube, and the torque ball is seated in socket formed in an adaptor housing that is mounted on a rearward side of the engine mounting plate. The engine mounting plate is located toward the center of the chassis of the racing car, and forms a significant link for locating the rear end assembly on the car.

The large amount of power generated by the engine of the racing car is transferred by the driveline to the rear axle. This significant power applied to the rear axle and the wheels produces a reactionary torque that acts on the rear axle housing in a rotational direction opposite to the direction of the rotation of the rear wheels. This reactionary torque is in turn applied to the torque tube of the driveline. The forward end of the torque tube is thus forced upward by the reactionary torque of the rear axle. The weight of the race car (e.g., the engine, chassis, and driver) acts downwardly on the forward end of the torque tube through the engine mounting plate and the adaptor housing to counter the reactionary torque, and to thereby keep the front wheels of the car in sufficient contact with the ground surface to facilitate effective steering of the car for maximizing the handling of the car.

It is thus desirable to maximize the transfer of the downward force of the weight of the car to the torque tube and thus to the rear end assembly to counter the lifting of the torque tube as a result of the reactionary torque acting on the rear axle housing.

The design of conventional racing car drivelines have remained virtually unchanged for approximately twenty years, except for the substitution of lighter weight materials for the various driveline components, and thus the ability to counter the lifting torque of the torque tube on the car has also remained relatively the same. In contrast, the power available from the engines has consistently increased, while the weight of the components of the cars has decreased. The desired increases in the power of the car applied to the rear wheels thus has the disadvantage of increasing the reactionary lifting torque applied to the chassis of the car through the torque tube, and thus can cause degradation of the handling characteristics of the car.

SUMMARY OF THE INVENTION

It is believed that one way of improving the handling characteristics of the racing car in the face of ever-increasing amounts of horsepower is to maximize the portion of the overall weight of the car that may be applied to the torque tube to counter the reactionary torque transferred from the rear axle housing to the torque tube. One manner of accomplishing this goal is to move the swivel joint of the torque tube forward, and thus closer to the center of the car and, most importantly, toward the heaviest component of the car, namely the engine. Moving the swivel joint forward (with the rear axle remaining in relatively the same position) increases the length of the torque tube, and thus increases the length of the lever arm on which the force of the weight of the car is applied to the rear axle housing to counter the reactionary torque.

However, minimization of the distance between the swivel joint of the torque tube and engine mounting plate has been restricted by the relative length of the universal joint in the driveline that connects the crankshaft to the drive shaft. The center of swivel of the universal joint dictates the location of the center of swivel of the torque ball, as these centers of swivel must be coincident to avoid binding of the swivel joints. Thus, the ability to move the position of the torque ball swivel toward the engine is dictated in part, and limited by, the ability to move the position of the universal joint toward the engine. Conversely, the ability to shorten the distance between the end of the universal joint mounted on the crankshaft and the center of swivel of the universal joint has been severely limited by the need to retain as great of a degree (or angle) of swivel as possible without binding or interference of the joint components. As noted above, the design of the universal joints utilized in the drivelines of racing cars has remained virtually the same for two decades.

The invention contemplates a universal joint with a relatively shortened length as compared to those heretofore known and used in applications such as those described above, especially in the distance between the crankshaft mounting surface and the center of swivel of the joint, to thereby permit a commensurate shortening of the distance between the engine mounting plate and the center of swivel of the torque ball. To attain this, the present invention generally comprises a joint assembly including a yoke for connecting to an end of the drive shaft. The yoke includes a shaft portion for mounting on the drive shaft and a pair of yoke ears mounted on the shaft portion. The joint assembly includes a flange for connecting to an end of the crankshaft of the engine. The flange includes a flange plate for mounting against the end of the crankshaft. The flange plate has a first side and a second side with the first side being adapted for positioning adjacent to the crankshaft. The flange includes a pair of flange ears mounted on the flange plate. The flange ears extend from the second side of the flange plate. A spider rotatably joins the yoke and flange together. A pair of cupped areas is formed in the flange plate for providing space for each of the yoke ears of the yoke. A portion of the second side of the flange plate defines a plane, and the cupped areas extend through the plane of the second side and into the flange plate. A portion of each of the yoke ears extends substantially adjacent to the plane of the second side of the flange plate when axes of rotation of the yoke and flange are collinear.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION

With reference now to the drawings, and in particular to FIGS. 1 through 8 thereof, a reduced length universal joint assembly embodying the principles and concepts of the present invention will be described.

Figure 1:
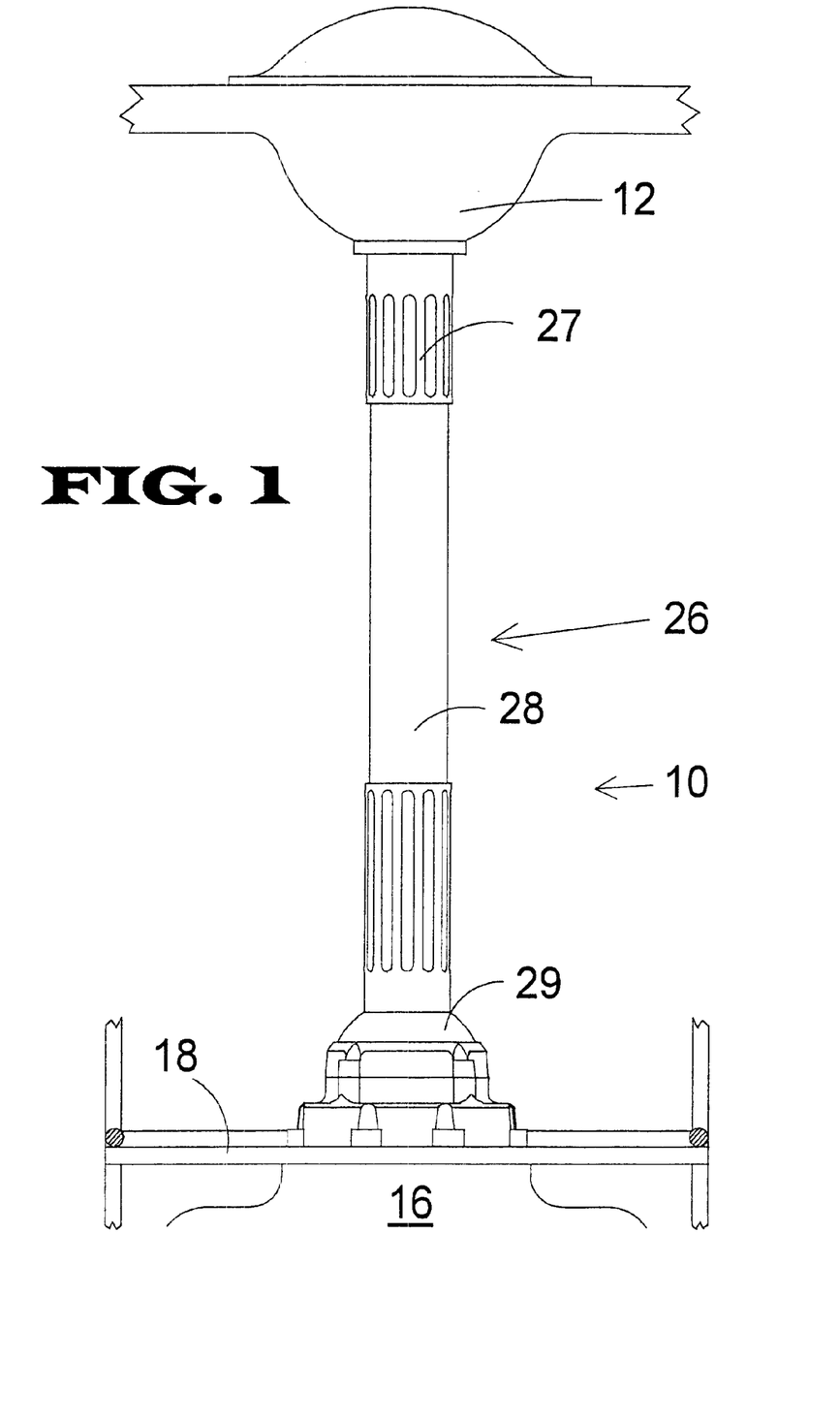
FIG. 1 is a schematic top view of a portion of a drive train of a racing car highly suitable for use of the reduced length universal joint assembly of the present invention.
Figure 2:
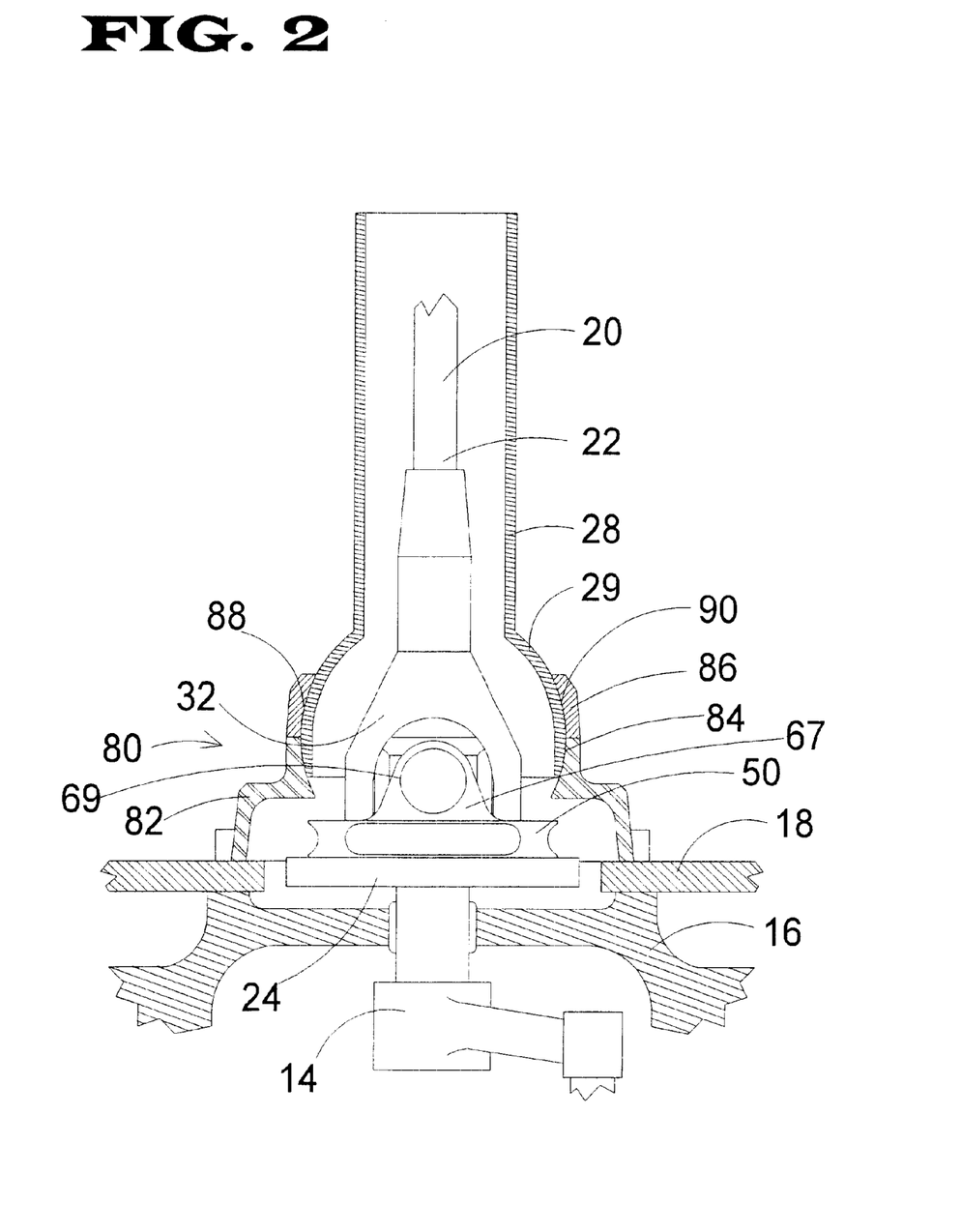
FIG. 2 is a schematic sectional view of a forward portion of the drive train shown in FIG. 1, and particularly illustrates the universal joint assembly mounted between the crankshaft of the engine and the drive shaft of the driveline.

Racing vehicles, such those commonly referred to as racing cars, include a driveline 10 for transferring power between a rear end 12 and a crankshaft 14 of an engine 16. Typically, the engine is mounted on an engine mounting plate 18 mounted on a chassis of the vehicle. The rear end has a rear axle, and a gear set rotationally coupled to the rear axle.

A driveline 10 suitable for the practice of the invention may include a drive shaft 20 for connecting the crankshaft to the gear set of the rear axle. The drive shaft 20 has a front end 22 for connecting to the joint assembly and has a rear end for connecting to the gear set of the rear end. A torque tube assembly 26 may extend between the engine mounting plate and the rear end of the car. The torque tube assembly 26 may be mounted on the engine mounting plate 18 in a manner permitting swivel movement of the torque tube using an adaptor assembly 80. The torque tube assembly 26 may comprise a torque tube 28 having an interior for receiving the drive shaft 20, and having a forward end and a rearward end. The torque tube assembly may also include a torque ball 29 for mounting the torque tube to the adaptor assembly in a manner permitting swivel movement of the torque tube with respect to the engine mounting plate. The torque tube assembly may also include a mounting collar 27 for rigidly mounting the torque tube to the rear end of the rear axle.

Figure 5:
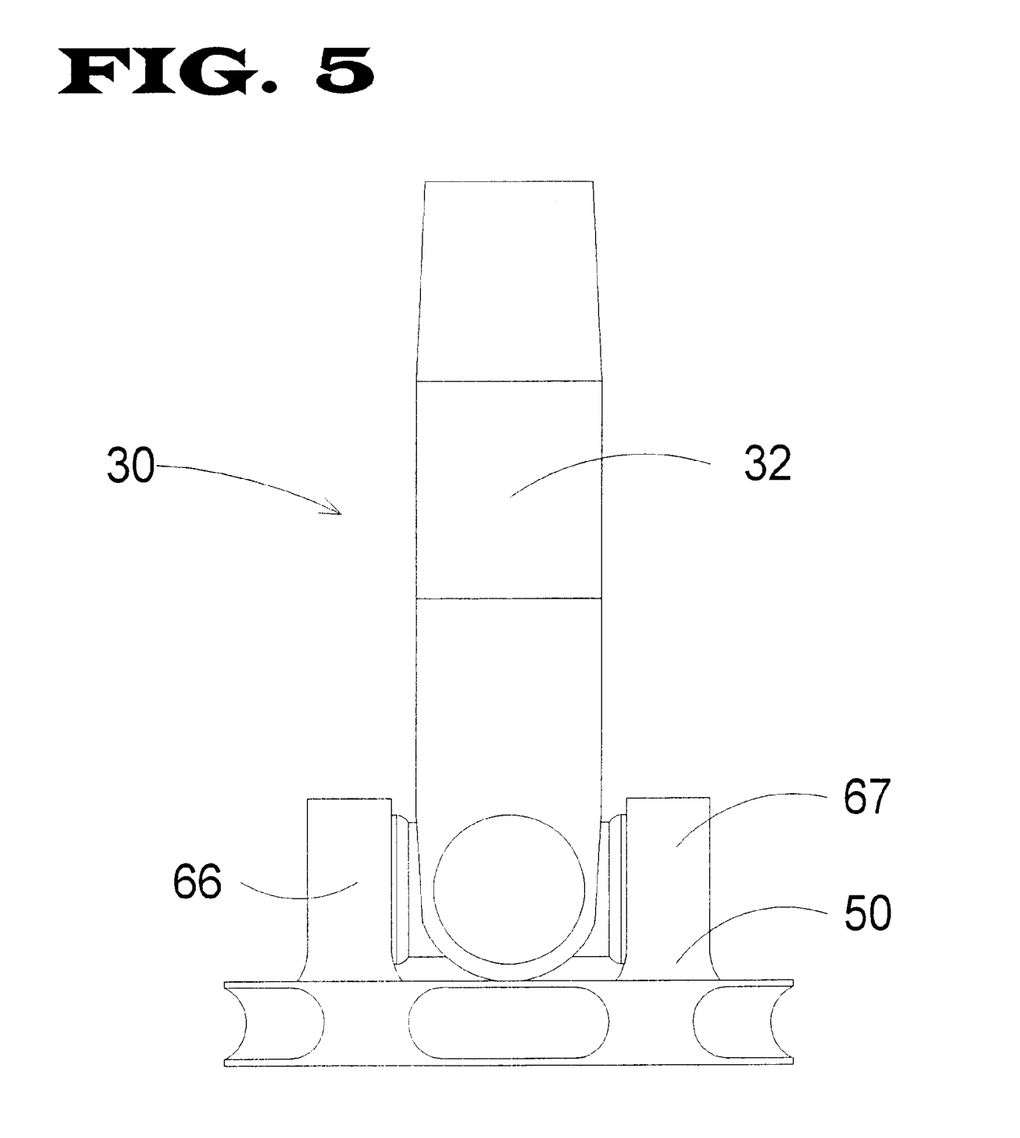
FIG. 5 is a schematic side view of the universal joint assembly of the present invention.
Figure 6:
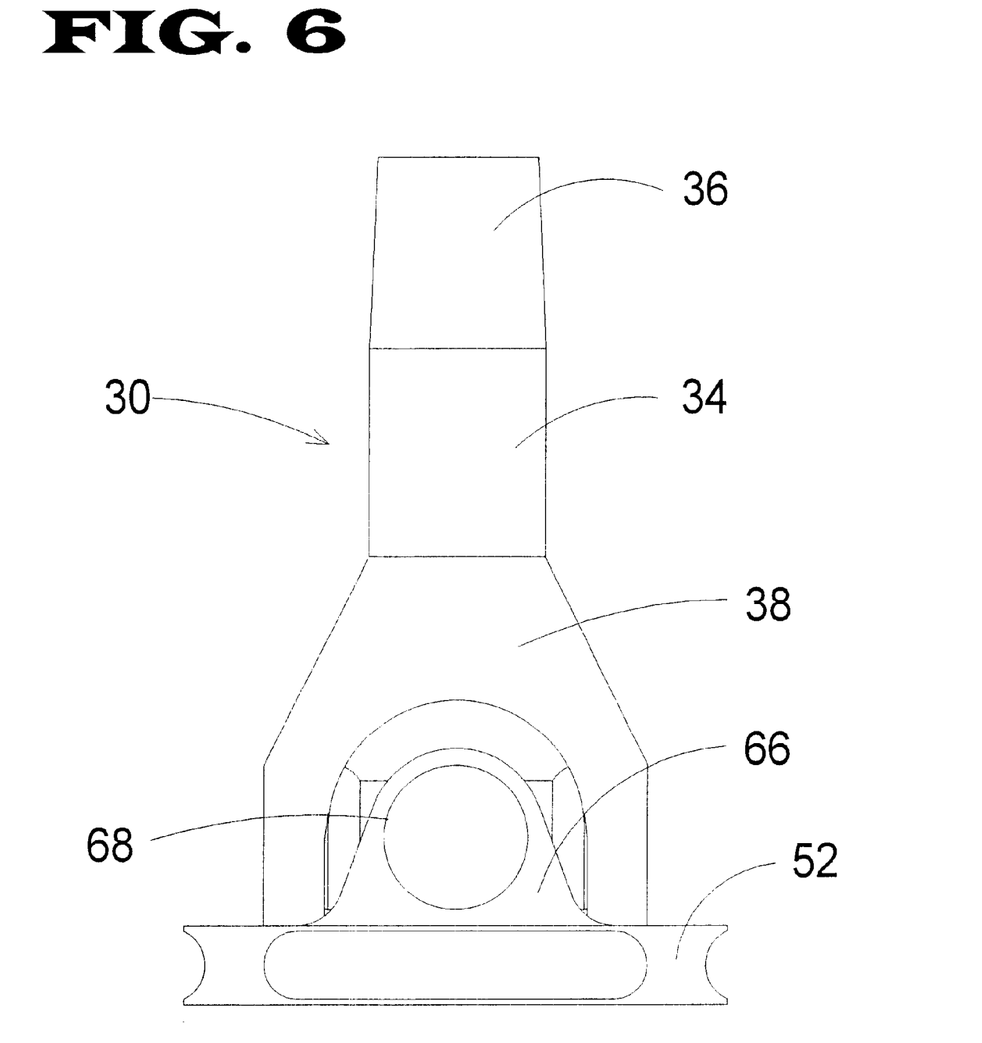
FIG. 6 is a schematic side view of the universal joint of the present invention taken from a perspective orthogonal to the view in FIG. 5.

The joint assembly 30 of the invention may be used for connecting the drive shaft to the rear of the crankshaft 14 of the engine of the car. The joint assembly includes a yoke 32 that may be connected to a front end 22 of the drive shaft. The yoke may comprise a shaft portion for mounting on the drive shaft. The shaft portion 34 may have a first end 36 for mounting on the drive shaft, and a second end 38 opposite the first end. The shaft portion may have a substantially cylindrical exterior shape, although other shapes may be used. The first end may have a channel 40 formed therein for receiving the front end 22 of the drive shaft. An interior surface of the channel may be provided with a plurality of alternating axial ridges and grooves (not shown) for engaging splines formed on the forward end of the drive shaft.

The yoke 32 may also have a pair of yoke ears 42, 43 mounted on the second end 38 of the shaft portion. The yoke ears may be spaced from each other to form a gap therebetween. Each of the yoke ears may extend from the second end of the shaft portion in a substantially parallel relationship to each other. Each of the yoke ears may have a bore 44, 45 therein, and the bores of the ears may be axially aligned for receiving opposite stub shafts of the spider.

Figure 3:
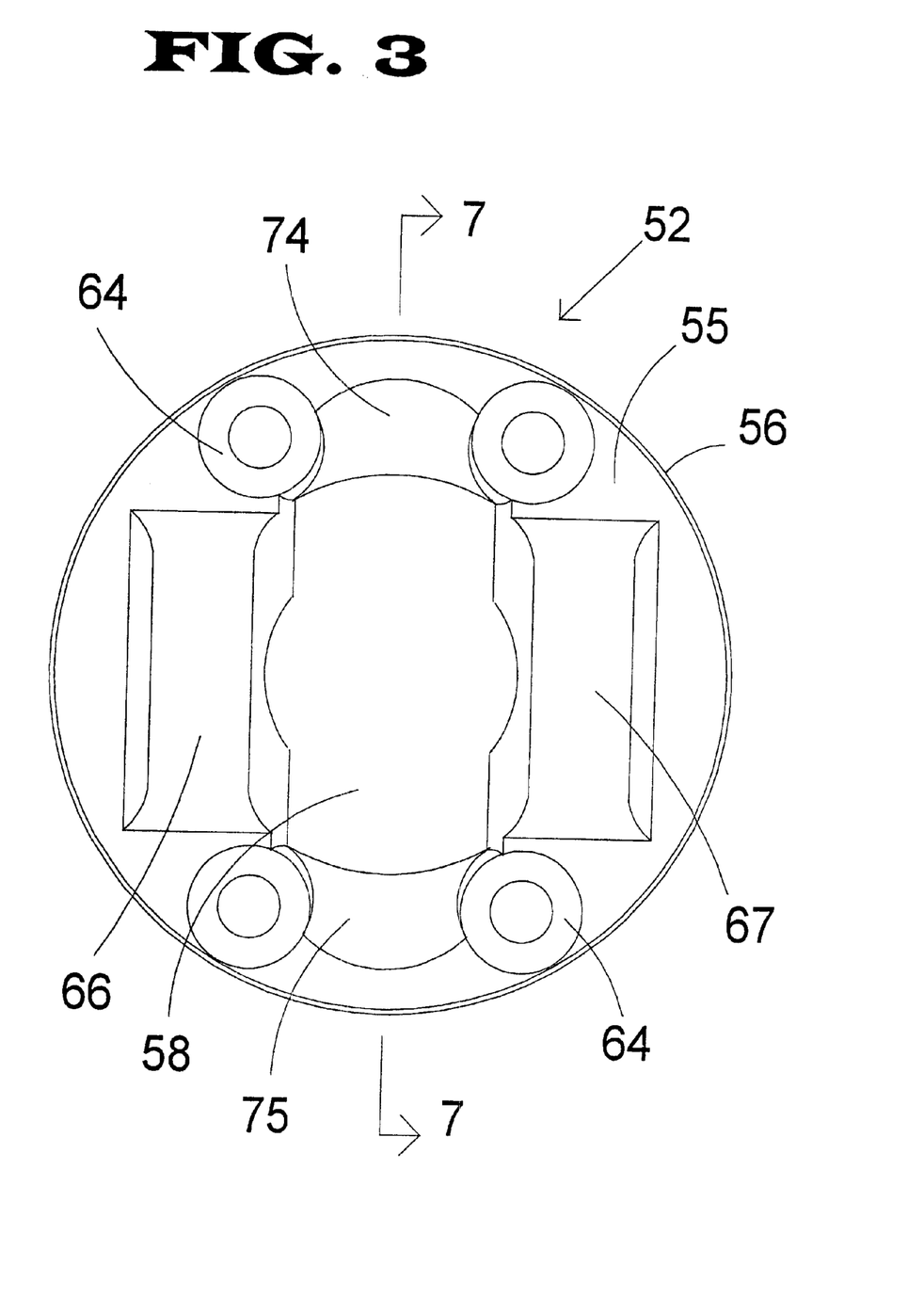
FIG. 3 is a schematic end view of a second side of the flange of the present invention.
Figure 4:
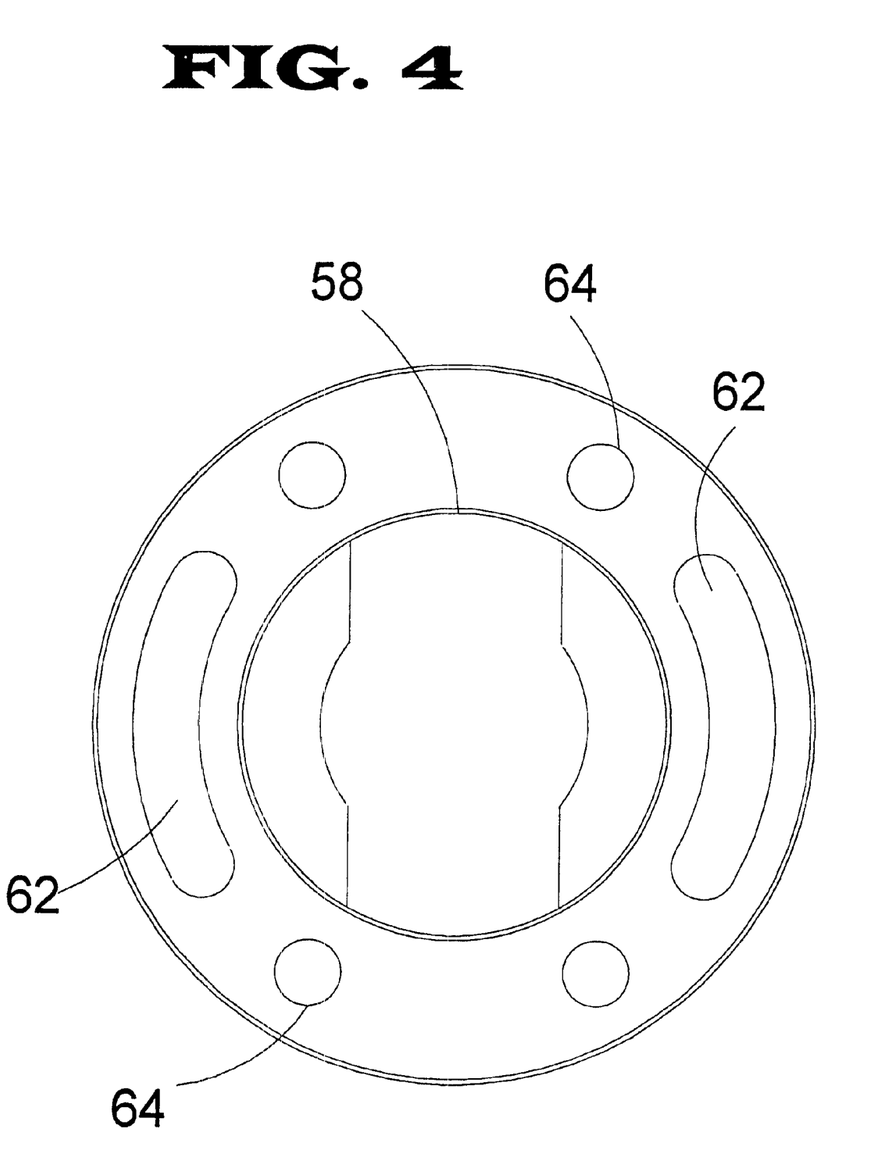
FIG. 4 is a schematic end view of a first side of the flange of the present invention.
Figure 7:
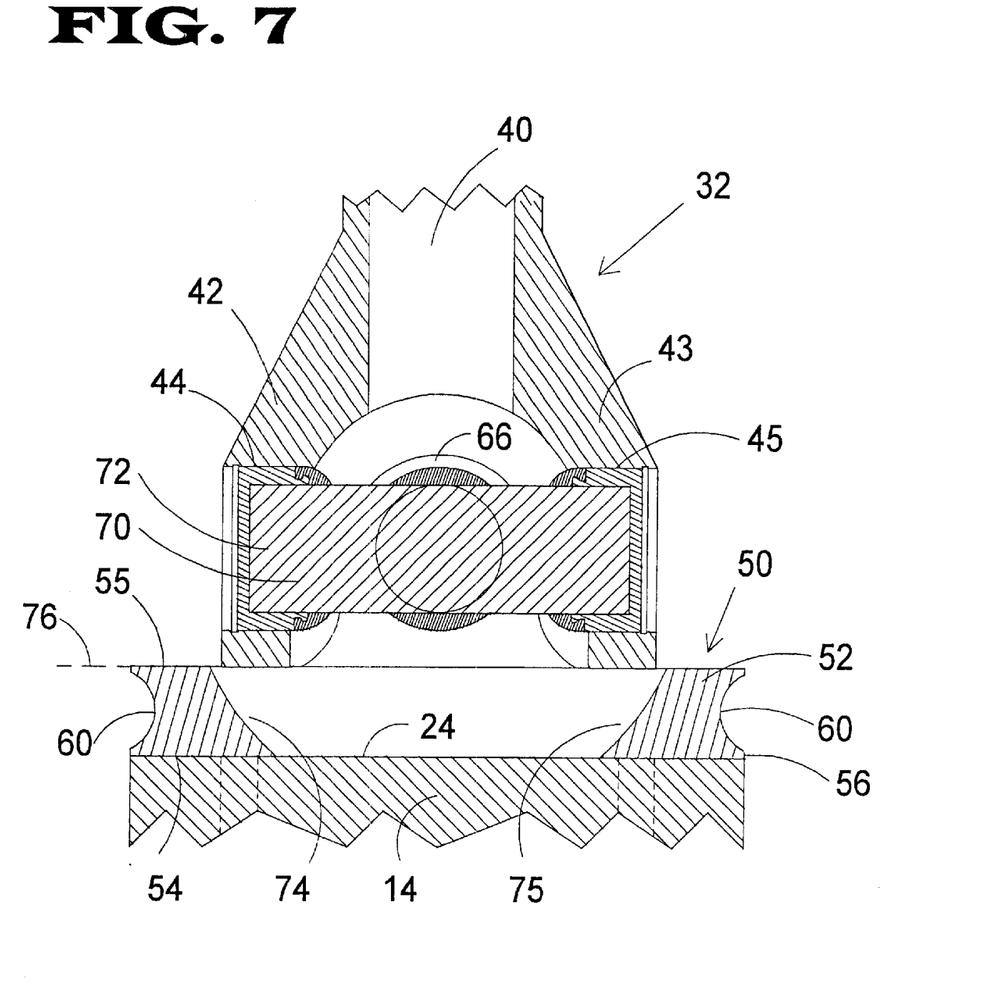
FIG. 7 is a schematic sectional view of the flange taken along line 7—7 of FIG. 3 and additionally showing the yoke mounted on the flange.
Figure 8:
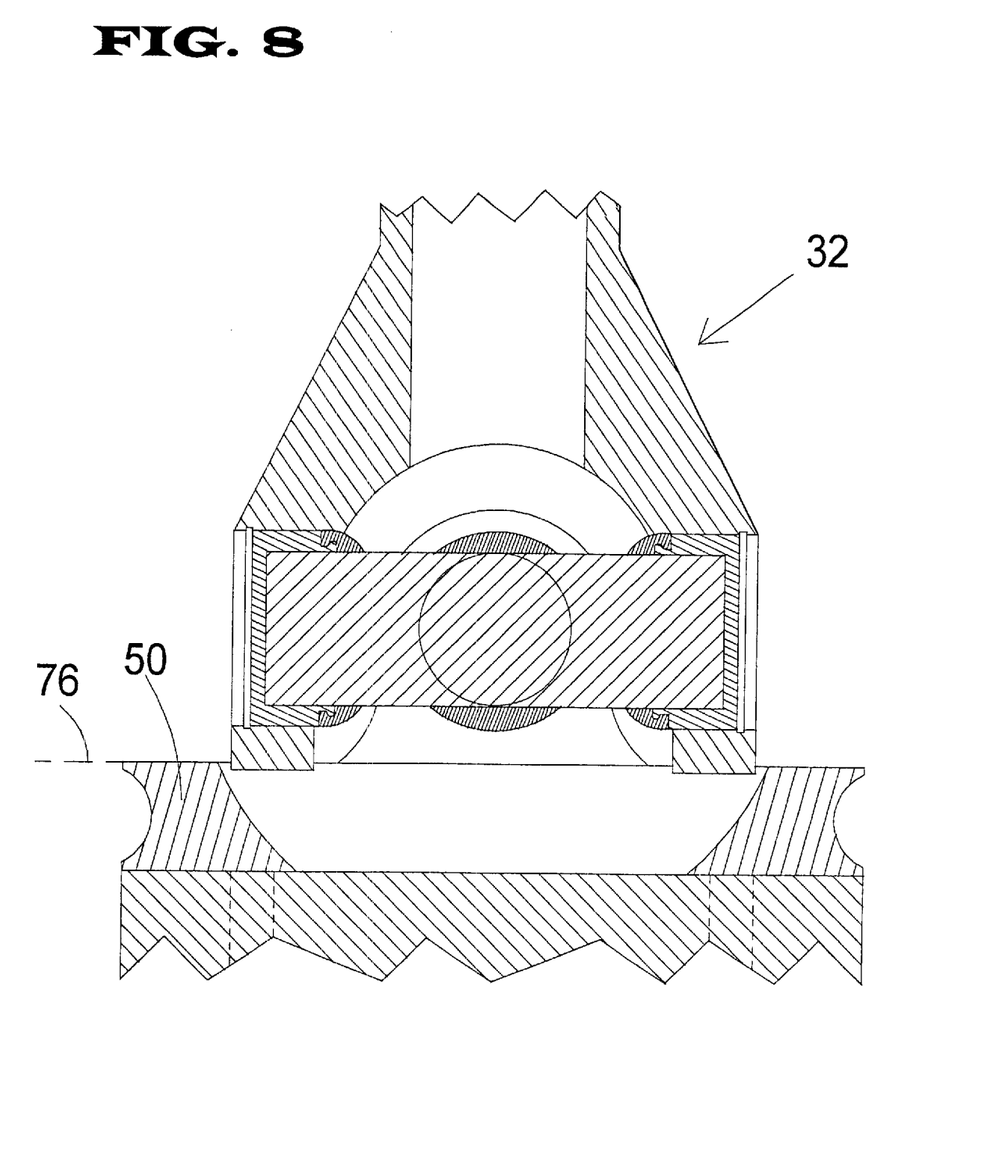
FIG. 8 is a schematic sectional view of an optional configuration of the components shown in FIG. 7.

The joint assembly 30 also includes a flange 50 that may be connected to a rearward end 24 of the crankshaft of the engine. The flange may include a flange plate 52 that may be mounted against the end of the crankshaft. The flange plate 52 may have a first side 54 and a second side 55, with the first side being adapted for abutting against the end of the crankshaft. The flange plate may have a perimeter edge 56, and the perimeter edge may be substantially circular in shape. The flange plate may have a central opening 58 extending into the second side of the flange plate. The central opening 58 may extend through the flange plate from the second side 55 to the first side 54. The central opening may be substantially circular in shape at the first side 54, and the central opening may have an oblong shape at the second side 55.

Optionally, the perimeter edge 56 of the flange plate may have at least one edge groove 60 formed therein for reducing the weight of the flange plate and the overall joint assembly. A plurality of edge grooves 60 may be formed in the perimeter edge of the flange plate. The plurality of edge grooves may extend along a circumference of the perimeter edge of the flange plate. As a further option to reduce the weight of the flange plate, the second side 55 of the flange plate may have at least one face groove 62 formed therein, and a plurality of face grooves may be formed in the second side. The plurality of face grooves may be arcuate in shape, and may extend substantially adjacent to the perimeter edge of the flange plate.

As a further option, a plurality of mounting apertures 64 may be formed in the flange plate between the first and second sides for permitting fasteners to be passed through the plate and attached to the end 24 of the crankshaft 14.

The flange also may include a pair of flange ears 66, 67 mounted on the flange plate. The flange ears may be spaced from each other to form a gap therebetween. The flange ears may extend outwardly from the second side of the flange plate. Each of the flange ears may have a bore 68, 69 therein, and the bores of the ears may be axially aligned for receiving opposite stub shafts of the spider.

The joint assembly 30 also may include a spider 70 that rotatably joins the yoke and flange together in a manner permitting misalignment of axes of rotations of the flange and the yoke. The spider may have four stub shafts 72 extending therefrom at substantially perpendicular angles with respect to each other. Each of the stub shafts may be positioned in one of the bores 44, 45, 68, 69 of the ears of the yoke and the flanges to connect the yoke 32 and flange 50.

Significantly, a pair of cupped spaces or areas 74, 75 may be formed in the flange plate for providing space for each of the yoke ears of the yoke, especially when the rotational axes of the yoke and flange are not in parallel or collinear alignment and one of the yoke ears is pivoted toward the flange plate and the other of the yoke ears is pivoted away from the flange plate. A portion of the second side of the flange plate may be flat, and conceptually define a plane 76. The cupped areas extend through the plane of the second side and into the flange plate toward the first side. Each of the cupped areas may have a surface defining a portion of a sphere, although the cupped areas may have other shapes. Each of the cupped areas may form an end portion of the oblong shape of the central opening at the second side of the flange plate portion.

A portion of each of the yoke ears of the joint assembly extends substantially adjacent to the plane of the second side of the flange plate when axes of rotation of the yoke and flange are collinear (see FIG. 7). This positioning of the yoke ears permits a very compact distance between the first side of the flange plate and the center of swivel of the joint thus bringing the location of the swivel closer to the crankshaft of the engine. Optionally, for a further reduction of the distance, a portion of each of the yoke ears may touch or extend into the plane of the second side when the axes of rotation of the yoke and flange are collinear. As a further option, for an even greater reduction of the distance between the first side and the center of swivel, a portion of each of the yoke ears may extending through the plane of the second side and into the cupped areas of the flange plate when the axes of rotation of the yoke and flange are collinear (see FIG. 8).

The positioning of the yoke ears with respect to the plane of the second side of the flange plate permits the positioning of the center of swivel of the joint closer to the first side of the flange plate, and thus closer to the crankshaft of the engine. Significantly, this in turn permits the movement of the torque ball 29, and the center of swivel of the torque ball, closer to the engine mounting plate and the engine, so that a greater portion of the weight of the engine and the chassis (applied through the engine mounting plate) is applied to the torque tube 28.

To accommodate the shorter distance possible between the torque ball and the engine mounting plate, the invention may include an adaptor assembly 80 that is reduced in front to back length a distance that is approximately equal to a reduction in the distance between the end of the crankshaft and the center of swivel of the universal joint. The adaptor assembly 80 may include an adaptor housing 82 for mounting on the engine mounting plate. The adaptor housing may be generally annular with a passage for a portion of the joint assembly to extend therethrough. A front of the adaptor housing may be adapted for being mounting on a rear face of the engine mounting plate 18. A rear of the adaptor housing may define a housing socket 84 in communication with the passage in the adaptor housing.

The adaptor assembly 80 may also include an adaptor collar 86 for mounting on a front of the adaptor housing 82. The adaptor collar 86 may also be generally annular with a passage therethrough. A front of the adaptor collar 86 may define a collar socket 88 in communication with the passage in the adaptor collar. The collar socket may be adapted to form a portion of a spherical surface 90 with the housing socket, and together the housing socket and the collar socket may receive the torque ball of the torque tube.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A reduced length joint assembly for connecting a drive shaft to an engine, the joint assembly comprising:
    a yoke for connecting to an end of the drive shaft, the yoke including a shaft portion for mounting on the drive shaft and a pair of yoke ears mounted on the shaft portion;
    a flange for connecting to an end of the crankshaft of the engine, the flange including a flange plate for mounting against the end of the crankshaft, the flange plate having a first side and a second side with the first side being adapted for positioning adjacent to the crankshaft, the flange including a pair of flange ears mounted on the flange plate, the flange ears extending from the second side of the flange plate; and a spider rotatably joining the yoke and flange together;

wherein a pair of cupped areas is formed in the flange plate for providing space for each of the yoke ears of the yoke, a portion of the second side of the flange plate defining a plane, the cupped areas extending through the plane of the second side and into the flange plate; and wherein a portion of each of the yoke ears extends substantially adjacent to the plane of the second side of the flange plate when axes of rotation of the yoke and flange are collinear;

wherein the flange plate has a central opening extending into the second side of the flange plate and being in communication with each of the cupped areas such that said cupped areas form end portions of an oblong recess in the second side of the flange plate.

2. The joint assembly of claim 1 wherein a portion of each of the yoke ears extends through the plane of the second side of the flange plate and into the cupped areas when axes of rotation of the yoke and flange are collinear.

3. The joint assembly of claim 1 wherein the shaft portion has a first end for mounting on the drive shaft and a second end opposite the first end, the first end having a channel formed therein for receiving an end of the drive shaft, an interior surface of the channel having a plurality of splines formed therein.

4. The joint assembly of claim 1 wherein the flange plate has a perimeter edge, the perimeter edge having at least one elongate edge groove formed therein, the elongate edge groove having a longitudinal extent extending along a portion of a circumference of the perimeter edge.

5. The joint assembly of claim 1 wherein a plurality of elongate edge grooves is formed in the perimeter edge, the plurality of edge grooves each having a longitudinal extent extending along a portion of a circumference of the perimeter edge of the flange plate.

6. The joint assembly of claim 1 wherein the flange plate has an outer perimeter, the second face of the flange plate having a substantially planar surface extending from the central opening to the perimeter of the flange plate and the first face of the flange plate having a substantially planar surface extending from the central opening to the perimeter of the flange plate.

7. The joint assembly of claim 1 wherein the central opening extends through the flange plate from the second side to the first side.

8. The joint assembly of claim 7 wherein the central opening is substantially circular at the first side.

9. The joint assembly of claim 1 wherein each of the cupped areas has a surface defining a portion of a sphere.

10. The joint assembly of claim 1 wherein a portion of the second side of the flange plate extends radially outwardly in a substantially planar manner from the flange ears to the perimeter of the flange plate.

11. The joint assembly of claim 1 wherein the first side of the flange plate has at least one face groove formed therein.

12. The joint assembly of claim 11 wherein a plurality of face grooves is formed in the first side.

13. The joint assembly of claim 11 wherein each of the face grooves is arcuate and extends adjacent to a perimeter edge of the flange plate.

14. The joint assembly of claim 1 wherein a plurality of mounting apertures are formed in the flange plate.

15. The joint assembly of claim 1 wherein the first side of the flange plate is substantially planar and the second side of the flange plate is substantially planar.

16. The joint assembly of claim 15 wherein the plane of the second side of the flange plate is substantially parallel to a plane of the first side of the flange plate such that the flange plate has a substantially uniform thickness between the first and second faces and between the central opening and a perimeter of the flange plate.

17. The joint assembly of claim 15 wherein the planes of the first and second faces are oriented perpendicular to the axis of rotation of the flange.

18. The joint assembly of claim 1 wherein a portion of each of the yoke ears extends through the plane of the second side of the flange plate and into the cupped areas when axes of rotation of the yoke and flange are collinear;

wherein the shaft portion has a first end for mounting on the drive shaft and a second end opposite the first end, the first end having a channel formed therein for receiving an end of the drive shaft, an interior surface of the channel having a plurality of splines formed therein;

wherein a plurality of elongate edge grooves is formed in the perimeter edge, the plurality of edge grooves each having a longitudinal extent extending along a portion of a circumference of the perimeter edge of the flange plate;

wherein the flange plate has an outer perimeter, the second face of the flange plate having a substantially planar surface extending from the central opening to the perimeter of the flange plate and the first face of the flange plate having a substantially planar surface extending from the central opening to the perimeter of the flange plate;

wherein the central opening extends through the flange plate from the second side to the first side;

wherein the central opening is substantially circular at the first side;

wherein each of the cupped areas has a surface defining a portion of a sphere;

wherein a portion of the second side of the flange plate extends radially outwardly in a substantially planar manner from the flange ears to the perimeter of the flange plate;

wherein the first side of the flange plate has a plurality of face grooves is formed in the first side, each of the face grooves being arcuate and extending adjacent to a perimeter edge of the flange plate;

wherein a plurality of mounting apertures are formed in the flange plate;

wherein the first side of the flange plate is substantially planar and the second side of the flange plate is substantially planar;

wherein the plane of the second side of the flange plate is substantially parallel to a plane of the first side of the flange plate such that the flange plate has a substantially uniform thickness between the first and second faces and between the central opening and a perimeter of the flange plate; and wherein the planes of the first and second faces are oriented perpendicular to the axis of rotation of the flange.

19. A driveline for a vehicle for transferring power between a rear end and a crankshaft of an engine, the engine being mounted on an engine mounting plate mounted on a chassis of the vehicle, the rear end having a rear axle, and gear set rotationally coupled to the rear axle, the driveline comprising:

a drive shaft for connecting the crankshaft to the gear set of the rear axle, the drive shaft having a front end for connecting to the crankshaft and a rear end for connecting to the gear set of the rear end;

a reduced length joint assembly for connecting a drive shaft to an engine, the joint assembly comprising:

a yoke for connecting to an end of the drive shaft, the yoke including a shaft portion for mounting on the drive shaft and a pair of yoke ears mounted on the shaft portion:

a flange for connecting to an end of the crankshaft of the engine, the flange including a flange plate for mounting against the end of the crankshaft, the flange plate having a first side and a second side with the first side being adapted for positioning adjacent to the crankshaft, the flange including a pair of flange ears mounted on the flange plate, the flange ears extending from the second side of the flange plate; and         a spider rotatably joining the yoke and flange together;

wherein a pair of cupped areas is formed in the flange plate for providing space for each of the yoke ears of the yoke, a portion of the second side of the flange plate defining a plane, the cupped areas extending through the plane of the second side and into the flange plate; and         wherein a portion of each of the yoke ears extends substantially adjacent to the plane of the second side of the flange plate when axes of rotation of the yoke and flange are collinear; and         wherein the flange plate has a central opening extending into the second side of the flange plate and being in communication with each of the cupped areas such that said cupped areas form end portions of an oblong recess in the second side of the flange plate;

an adaptor assembly for mounting on the engine mounting plate, the adaptor assembly including:

an adaptor housing for mounting on the engine mounting plate, the adaptor housing being annular with a passage therethrough, a front of the adaptor housing being adapted for mounting on a rear face of the engine mounting plate, a rear of the adaptor housing defining a housing socket in communication with the passage in the adaptor housing;

an adaptor collar for mounting on a front of the adaptor housing, the adaptor collar being annular with a passage therethrough, a front of the adaptor collar defining a collar socket in communication with the passage in the adaptor collar, the collar socket being adapted to form a portion of a spherical surface with the housing socket; and     a torque tube assembly for extending between the engine mounting plate and the rear end, the torque tube assembly being mountable on the engine mounting plate in a manner permitting swivel movement of the torque tube with respect to the engine mounting plate, the torque tube assembly comprising:

a torque tube having an interior for receiving the drive shaft, the torque tube having a forward end and a rearward end;

a torque ball for mounting the torque tube to the engine mounting plate in a manner permitting swivel movement of the torque tube with respect to the engine mounting plate, the torque ball being mounted on the forward end of the torque tube;

a mounting collar for mounting the torque tube to the rear axle, the mounting collar being mounted on a rear end of the torque tube.

20. The driveline of claim 19 wherein a portion of each of the yoke ears of the joint assembly extends through the plane of the second side of the flange plate and into the cupped areas when axes of rotation of the yoke and flange are collinear.

21. The driveline of claim 19 wherein the flange plate has a perimeter edge, the perimeter edge having a plurality of edge grooves formed therein, the plurality of edge grooves extending along a circumference of the perimeter edge of the flange plate, the first side of the flange plate having a plurality of face grooves formed in the second side, the plurality of face grooves being arcuate and extending adjacent to the perimeter edge of the flange plate.

22. The driveline of claim 19 wherein the central opening extends through the flange plate from the second side to the first side, the central opening being substantially circular at the first side, each of the cupped areas having a surface defining a portion of a sphere.

\* \* \* \* \*